United States Patent Office 3,404,134
Patented Oct. 1, 1968

3,404,134
PROCESS OF CROSSLINKING POLYMERS
Richard Watkin Rees, Wilmington, Del., assignor to E. I. du Pont de Nemours and Company, Wilmington, Del., a corporation of Delaware
No Drawing. Continuation-in-part of applications Ser. No. 168,839, Jan. 25, 1962, and Ser. No. 271,477, Apr. 8, 1963. This application Feb. 28, 1964, Ser. No. 348,293
The portion of the term of the patent subsequent to Aug. 2, 1983, has been disclaimed
7 Claims. (Cl. 260—78.5)

ABSTRACT OF THE DISCLOSURE

The process of ionically cross-linking copolymers containing carboxylic acid groups by adding the cation-supplying material at elevated pressure and at a temperature of above the melting point of the copolymer.

---

This application is a continuation-in-part of application Ser. No. 168,839, filed Jan. 25, 1962, now abandoned and application Ser. 271,477, filed Apr. 8, 1963, now U.S. Patent No. 3,264,272. U.S. Patent No. 3,264,272 is a continuation-in-part of application Ser. No. 135,147 filed Aug. 31, 1961, now abandoned.

This invention relates to the process of producing ion linked copolymers.

Ion linked hydrocarbon polymers are described in Belgian Patent 621,846, and U.S. patent application Serial No. 168,839. Ion linked hydrocarbon copolymers as described in the Belgian patent are copolymers of alpha olefins and alpha, beta ethylenically unsaturated carboxylic acids in which some carboxylic acid groups have been neutralized with metallic cations. The ion linked copolymers described in U.S. patent application Serial No. 168,839 are copolymers of alpha olefins and alpha, beta ethylenically unsaturated carboxylic acids in which some of the carboxylic acid groups havve been neutralized with amine cations. The term "neutralized" as used in the Belgian Patent and the U.S. application is defined as that reaction that takes place between the metallic or amine cations and the carboxylic acid groups of the copolymer. A comparison of the infrared spectrum of the unreacted copolymer with that of the reacted (neutralized) copolymer explains to some extent the nature of this "neutralization" reaction. Such a comparison shows the appearance of an absorption band at about 6.4 microns which is characteristic of the ionized carboxyl group, COO⁻, a decrease in the crystallinity band at 13.7 microns and a substantial decrease, depending on the degree of neutralization, of a band at 10.6 microns, characteristic of the unionized carboxyl group, COOH. It therefore appears that the properties of these reacted copolymers is the result of an ionic attraction between the metal ion or the amine and one or more ionized carboxyl groups.

It is one of the objects of this invention to provide a process for the production of the ionic copolymers disclosed in this Belgian patent and in the U.S. patent application.

The process of the present invention comprises mixing a copolymer containing polymerized alpha olefin units and polymerized alpha, beta ethylenically unsaturated carboxylic acid units with a metallic or amine cation supplying material under such conditions that some of the carboxylic acid groups are neutralized.

The process of this invention may be carried out in many different types of apparatus and using many different reaction media. Specifically, the process of this invention may be carried out by dissolving the copolymer to be neutralized in a suitable solvent, and then introducing the cation that reacts with the carboxylic acid group into the solution. The process of the present invention may also be carried out by melt blending the copolymer to be neutralized with a material that will yield metallic or amine cations. The melt blending operation may take place using a rubber mill or an extractor extruder. The process of the present invention may also be carried out using a slurry process in which particles of the copolymer to be neutralized are slurried in a liquid containing the ion which reacts with the carboxylic acid groups. Also, the process of the present invention may be carried out by injection of cations into the polymerization reactor in which the copolymer has been formed, while the polymer is still molten or in solution.

In any of the specific processes of ionically linking the copolymer, it is necessary that some of the metallic or amine cation supplying material be dissolved in the reaction media under the reaction conditions.

The copolymers which may be crosslinked by the process of the present invention comprise at least one alpha olefin unit having the general formula

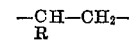

where R is a radical selected from the class consisting of hydrogen and hydrocarbyl radicals having one to eight carbon atoms and at least one alpha, beta ethylenically unsaturated carboxylic acid unit having one to two carboxylic acid groups. Preferably, the alpha, beta ethylenically unsaturated carboxylic acid unit has 3 to 8 carbon atoms. The concentration of the alpha olefin unit in the copolymer is at least 50 mol percent and preferably greater than 80 mol percent. The concentration of the alpha, beta ethylenically unsaturated carboxylic acid unit in the copolymer is 0.2 mol percent to 25 mol percent, preferably from 1 to 10 percent. Specific alpha olefin units useful in the copolymers include: ethylene, propylene, butene-1, styrene, pentene-1, hexene-1, heptene-1, 3 methylbutene-1, and 4 methylbutene-1. Specific alpha, beta ethylenically unsaturated carboxylic acid units useful in the copolymers include: acrylic, methacrylic, ethacrylic, itaconic, maleic, fumaric, monoesters of dicarboxylic acid such as ethyl hydrogen fumarate, and maleic anhydride. Maleic anhydride and other alpha, beta ethylenically unsaturated anhydrides are considered acids for the purposes of the present invention.

The preferred process for preparing the copolymers for use in the process of the present invention is direct copolymerization. This may be achieved by introducing the monomers into a polymerization environment maintained at high pressures, 50 to 3000 atmospheres, and at elevated temperatures, 150 to 300° C., together with a free radical polymerization catalyst. An inert solvent such as water or benzene may be employed in the polymerization environment. Random distribution of carboxylic acid groups in all the polymer molecules is best obtained by direct copolymerization. Particular processes for the production of the copolymers are known in the art and described in the literature.

The copolymers may also be obtained by grafting an alpha, beta ethylenically unsaturated carboxylic acid to a polyolefin base, or by conversion of a copolymer of a polyolefin and a derivative of carboxylic acid to the free acid.

The copolymers which are ion linked by the process of the present invention are preferably of high molecular weight. Molecular weight is suitably defined by melt index, a measure of viscosity described in detail in ASTM–D–1238–57T. The melt index of the copolymers preferred in the present invention is within the range of 0.1 to 1000 g./10 min.

The acid copolymer need not be a two component polymer. Thus, although the olefin content of the copolymer should be at least 50 mol percent, more than one olefin can be employed to provide the hydrocarbon nature of the copolymer, also more than one alpha, beta ethylenically unsaturated carboxylic acid may be employed. Additionally, any third copolymerizable monomer can be employed in combination with the olefin and the carboxylic acid comonomer. Preferred termonomers are vinyl esters and acrylates, i.e., alkyl acrylates and methacrylates having up to eight carbon atoms, such as vinyl acetate, vinyl propionate, methyl methacrylate and ethyl acrylate. The scope of base copolymers suitable for use in the present invention is illustrated by the following examples:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, and ethylene/methacrylic acid/maleic anhydride copolymers.

The copolymers may also, after polymerization but prior to ionic crosslinking, be further modified by various reactions to result in polymer modifications which do not interfere with neutralization. Halogenation of a copolymer is an example.

Blends of the alpha olefin, alpha, beta ethylenically unsaturated carboxylic acid copolymer with other alpha olefin, alpha, beta ethylenically unsaturated copolymers, or with other hydrocarbon polymers may be crosslinked by the process of this invention.

The cations useful in reacting with the carboxylic acid groups may be supplied as water soluble salts, or as insoluble compounds that can be converted to soluble salts by the addition of another reactant. The cations should have an effective valence of one to three. The term "effective valence" as used herein means that the cation forming material is readily ionized to form cations having a valence in the range of one to three, but that the cation forming material is not readily ionized to form cations having more than three valence charges; in other words, the cation is complexed to such an extent that the number of ionic charges is in every case in the range of 1 to 3. The preferred complexed metal ions are those in which all but one of the metal valences are complexed and one is readily ionized. Such compounds are in particular the mixed salts of very weak acids, such as oleic and stearic acid, with ionizable acids, such as formic and acetic acid.

The uncomplexed metal ions which are suitable for use in the process of the present invention comprise mono-, di- and trivalent ions of metals in Groups I, II, III, IV–A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated, dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The complexed metal ions which are suitable for use in the process of the present invention are di, tri, tetra or hexavalent ions that have been complexed so that their effective valence is within the range of 1 to 3, preferably 1. Suitable metal ions are the divalent and trivalent ions listed above, tetravalent ions such as $Ti^{+4}$, $Zr^{+4}$, $Hf^{+4}$, $V^{+4}$, $Ta^{+4}$, $W^{+4}$ and hexavalent ions such as $Cr^{+6}$, $Ce^{+6}$, and $Fe^{+6}$. Suitable complexing agents include stearate, oleate, salicylate, and phenolate radicals.

The amine cations which are suitable for use in the process of the present invention have the general formula:

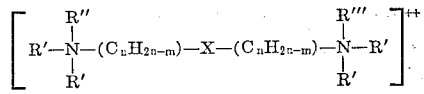

wherein R is selected from the class consisting of hydrogen and alkyl radicals having 1 to 5 carbon atoms, R'' and R''' are selected from the group consisting of hydrogen, alkyl radicals having 1 to 5 carbon atoms and alkylene radicals having 2 to 10 carbon atoms when R'' and R''' are combined, n is an integer from 1 to 10, m is an integer from 0 to 4, and X is selected from the group consisting of a carbon-carbon bond where X does not exceed 30 carbon atoms, a divalent oxygen radical, a divalent sulfur radical, an imine radical, a carbonyl radical and a phenylene radical.

The metallic cations can be added to the copolymer in the form of salts, oxides, hydroxide carbonate, free metal, metal hydride, metal alkoxide or organometallic compounds. If the metallic cation producing material is readily soluble in water at the reaction conditions, a considerable degree of reaction between metallic ions and the carboxyl groups will take place. The equilibrium of the reaction can be shifted to favor this reaction by removal of the anionic portion of the cation producing material as soon as it has become associated with the acid hydrogen. If the cation producing material is the salt of a very weak acid such as sodium resorcinol, the equilibrium of the reaction is sufficiently in favor of the formation of ion links, and no steps need to be taken to remove the anionic portion of the cation producing material from the copolymer.

If the metallic cation producing material is only slightly soluble at the reaction condition, it is necessary to remove the anionic portion of the cation producing material. This removal is readily accomplished by volatilizing or otherwise removing the anionic portion as soon as it has become associated with the acid hydrogen. It is therefore necessary that the slightly soluble metal cation producing material be selected so that the anionic portion may be readily removed.

If the metallic cation producing material is substantially insoluble under the reaction conditions, it is desirable to convert the insoluble material into a soluble or slightly soluble one in situ to accelerate the reaction. This may be readily accomplished in the case of metal oxides, hydroxides and carbonates by the addition of acid such as acetic acid, lactic acid, propionic acid, and mixtures of these acids.

The amine cation may be added to the copolymer in the form of diamines or ammonium salts. Diamines having a dissociation constant above $10^{-8}$ are suitable. The preferred diamines are aliphatic diamines such as ethylene diamine, tetramethyl diamine, hexamethylene diamine, octamethylene diamine, bis-(p-aminocyclohexyl)methane and decamethylene diamine. Other diamines such as piperazine, diethylene triamine, beta, beta'-diaminodiethyl ether, beta, beta-diaminodiethyl thioether, and phenylene diethyl amine.

The diamines may also be added to the copolymers of the present invention in the form of their ammonium salts which have the general formula

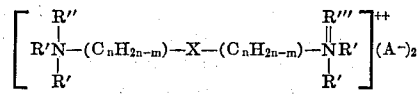

wherein R', R'', R''', X, m and n have the same meaning as above and where $A^-$ is an acid radical. The reaction of the ammonium salts with the acid copolymers employed as reagents in the present invention differs slightly. In the reaction of the diamine with the carboxylic acid group to form the ammonium salt and thereby the diamine modified copolymer, no by-products of any kind are formed. However, in the reaction of the described ammonium salt with the carboxylic acid group of the copolymer to result in the diamine modified copolymer, a side product $H^+A^-$ is formed. Since this reaction is an equilibrium reaction, it is necessary, in order to drive the reaction to completion and to obtain the ammonium salt formation with the acid groups of the copolymer, that the product $H^+A^-$ be of such a nature that it can be readily and completely removed from the reaction environment. It is, in general, therefore, preferred to employ ammonium salts in which the acid radical forms a product with the hydrogen of the carboxylic acid group of the copolymer which can be readily volatilized from the reaction mixture at reaction conditions. In particular, diammonium formates, acetates, methoxides, ethoxides, carbonates, and bicarbonates are preferred. The product of these acidic radicals with hydrogen can be readily volatilized from a mixture of the ammonium salt and the base copolymer. The reaction product of the acid copolymer and a diamine is identical to the reaction product obtained from the reaction of the base copolymer with an ammonium salt in which the acid radical is volatilized during the reaction with a base copolymer. Hence, both reaction products are considered diamine ion linked carboxylic acid copolymers.

The preferred metals, regardless of the nature of the acid copolymer are the alkali metals. These metals are preferred because they result in ion linked copolymers having the best combination of improvement in solid state properties with retention of melt fabricability. It is not essential that only one metal ion be employed in the formation of the ionic copolymers; in fact, more than one metal ion may be preferred in certain applications.

The quantity of ions employed or the degree of neutralization will differ with the degree of solid property change and the degree of melt property change desired. In general, it was found that the concentration of the cation should be at least such that the cation neutralizes at least 10 percent of the carboxylic acid groups in order to obtain a significant change in properties. As explained above, the degree of neutralization for optimum properties will vary with the acid concentration and the molecular weight of the copolymer. However, it is generally desirable to neutralize at least 50 percent of the acid groups. The degree of neutralization may be measured by several techniques. Thus, infrared analysis may be employed and the degree of neutralization calculated from the changes resulting in the absorption bands. Another method comprises the titration of a solution of the ionic copolymer with a strong base. Excess quantities of the cation do not add to the properties of the ionic copolymer of the present invention, since once all carboxylic acid groups have been ionically crosslinked, no further crosslinks are formed.

As stated earlier, the ionic crosslinking reaction may take place in a slurry. In carrying out this reaction in a slurry, it is desirable that the copolymer will stay submerged. Copolymer to be crosslinked is mixed with a liquid containing the cations to be used to crosslink. The concentration of the ions in the liquid is preferably 2 to 4 times that stoichiometrically necessary to neutralize a predetermined amount greater than 10% of the acid groups of said copolymer. The slurry should be maintained at a temperature within the range of 50 to 100° C. Higher temperatures within this range favor more rapid neutralization, but also favor more liquid absorption by the copolymer. The liquid used for the slurry may be any solvent for the cation forming material, but suitable solvents are water, lower aliphatic alcohols, such as methyl ethyl, propyl and butyl, and mixtures of these lower aliphatic alcohols with each other and/or water. The time of reaction will, of course, depend upon the temperature, the concentration of the cations, the pellet size of the copolymer and the desired degree of neutralization; however, the time will generally be between one-half hour and 8 hours. The pellet size of the copolymer may vary from less than 100 mesh pellets to greater than $3/16$-inch cubes. The pellets are not uniformly neutralized, for the carboxylic acid groups in the polymer molecules on the surface of the pellet will be totally neutralized, while those in the polymer molecules located at the center of the pellets will be substantially unneutralized.

Some of the liquid is absorbed by the pellets, and this must be removed. This may be conveniently accomplished by means of an extractor extruder, in which the liquid is volatilized.

In the following examples which illustrate the slurry process, all parts and percentages are in parts by weight unless otherwise stated.

EXAMPLE 1

300 grams of an ethylene methacrylic acid copolymer containing 90 weight percent ethylene and 10 weight percent methacrylic acid having a melt index of 5.8 g./10 min., an ultimate tensile strength of 3400 p.s.i., and a percent elongation of 550 in the form of 60 mesh pellets were introduced into 1500 g. of a 3.6 weight percent sodium hydroxide aqueous solution, under the following conditions with the following results:

| Time (min.) | Temp. (° C.) | Tensile (p.s.i.) | Elong. (percent) | M.I. |
|---|---|---|---|---|
| 30 | 96 | 4,600 | 310 | 0.03 |
| 30 | 75 | 4,900 | 330 | 0.04 |
| 30 | 100 | 5,100 | 350 | 0.09 |
| 30 | 50 | 4,000 | 400 | |
| 30 | 25 | 3,300 | 520 | |
| 10 | 75 | 3,800 | 380 | 0.46 |
| 10 | 96 | 3,900 | 260 | |
| 10 | 50 | 3,800 | 350 | |
| 10 | 25 | 3,700 | 470 | |

EXAMPLE 2

300 g. of a 90% ethylene 10% methacrylic acid copolymer as in Example I in the form of 60 mesh pellets were slurried in 1500 g. of methanol containing 3.6 weight percent sodium hydroxide, under the following conditions with the following results:

| Time (min.) | Temp. (° C.) | Tensile (p.s.i.) | Elong. (percent) | M.I. |
|---|---|---|---|---|
| 10 | 65 | 4,700 | 300 | 0.01 |
| 30 | 65 | 4,800 | 300 | (¹) |
| 3 | 65 | 4,700 | 350 | 0.2 |
| 5 | 65 | 4,600 | 360 | 0.23 |
| 7 | 65 | 4,500 | 320 | 0.15 |

¹ No flow.

EXAMPLE 3

25 pounds of the 10% methacrylic acid copolymer starting material of Example I was slurried in 245 pounds of methanol containing 3.0 pounds of hexamethylene diamine. The copolymer was in the form of 20 mesh pellets. Analysis of the liquid phase showed that after 2 hours, 1.5 pounds of the hexamethylene diamine had been reacted with the acid groups. The copolymer was more transparent and tougher than prior to neutralization. The melt index was substantially unchanged.

As stated earlier, the process of this invention can be carried out using a solution process, in which process the copolymer is dissolved in a solvent and reacted with cations contained in the solvent. Suitable solvents for the copolymer are aromatic hydrocarbon solvents such as xylene, benzene and toluene, or chlorinated hydrocarbon solvents such as carbon tetrachloride, tetrachloroethylene and trichloroethylene or hydrocarbon solvents such as cyclohexane, hexane, ethylene, etc., and mixtures of these. Viscosity modifiers such as lower aliphatic alcohols, surfactants and the like may be included. This reaction is best carried out at temperatures of 80 to 120° C. The cation producing material is usually added in the form of an aqueous solution.

The cations react with the acid groups substantially stoichiometrically and substantially instantaneously; thus, the degree of crosslinking can be predetermined by selection of the amount of cation added.

The concentration of the polymer in the solution may vary widely. It is usually preferred to have about 10% by weight polymer in the solvent, but this is not critical.

The copolymer is then removed from solution; this may be done by precipitation, or evaporation, and the copolymer dried to remove solvent, water, etc. The drying operation may be accomplished in a drying oven, but is preferably carried out in an extractor extruder.

In the following examples which illustrate the solution process, all parts and percentages are in parts by weight unless otherwise stated.

EXAMPLES 4 TO 9

Solutions of 50 g. batches of an ethylene/methacrylic acid copolymer containing 10 weight percent of methacrylic acid and having a melt index of 5.8 g./10 min. (ASTM-1238-57T) in 250 ml. of xylene were prepared and reacted with 0.5, 1.0, 2.5, 5, and 715 g. of hexamethylene diamine at 130° C. In each of the six additions, the reaction mixture was agitated for 15 minutes. The addition of the hexamethylene diamine to any of the six solutions did not cause an increase in viscosity. The products were recovered by precipitation with methanol and washed with water and acetone. The resulting dry products were compression molded into 60 mil sheets and the physical properties described in Table I were measured.

hexamethylene diamine and the resulting reaction mixture was agitated for 15 minutes at the temperature indicated. The product was recovered by precipitation with methanol and washed thoroughly with water and acetone. The dried diamine copolymer was compression molded and was found to have a significantly higher transparency than the unmodified copolymer tested under the same conditions. The resiliency of the modified copolymer was greatly increased by the reaction of the diamine with the copolymer.

EXAMPLE 11

To a solution of 50 g. of high density polyethylene containing 4.3% of acrylic acid grafted thereby by peroxide grafting, having a melt index of 6 g./10 min. in 250 g. of xylene was added at a temperature of 150° C. 2.5 g. of hexamethylene diamine. The reaction was continued at that temperature for 20 minutes with agitation. The resulting diamine modified copolymer was found to have substantially the same melt index but on molding resulted in a molding of increased stiffness and higher tensile properties. The transparency of the molding was measurably increased.

EXAMPLES 12 TO 15

Using the reaction procedure set forth in Examples 4 to 9, an ethylene/methacrylic acid copolymer containing 18 weight percent of methacrylic acid and having a melt index of 6.3 g./10 mins. was treated with 5, 10, and 18% by weight of hexamethylene diamine. Molded samples of the resulting isolated diamine modified copolymer were found to be transparent and resilient. The modified copolymers were subjected to tensile and stiffness tests. The results shown in Table II were obtained.

TABLE II

| Example | Wt. percent hexamethylene diamine | Melt index in g./10 min. | Stiffness in p.s.i.[1] | Yield strength in p.s.i.[2] | Ultimate strength in p.s.i.[2] | Ultimate elongation in p.s.i.[2] |
| --- | --- | --- | --- | --- | --- | --- |
| 12 | 0 | 6.3 | 16,400 | 1,440 | 5,000 | 500 |
| 13 | 5 | 2 | 35,600 | 1,740 | 5,300 | 350 |
| 14 | 10 | 1.5 | 46,140 | 1,950 | 4,850 | 340 |
| 15 | 18 | 1 | 63,380 | 2,470 | 5,200 | 300 |

[1] ASTM-D-747-58T.  [2] ASTM-D-412-57T.

EXAMPLES 16 TO 23

Employing the procedure of Examples 4 to 9 with the methacrylic acid copolymer therein used, the diamines listed in the table below were reacted with the acid copolymer to result in diamine modified copolymers. The resulting products were compression molded into 60 mil sheets and compared to the unmodified copolymer in their melt index, stiffness and tensile properties. The resulting data are compared in Table III. As can be seen from these

TABLE I

| Example | Percent hexamethylene diamine | | Melt index in g./10 min. | Stiffness in p.s.i.[1] | Yield strength in p.s.i.[2] | Ultimate tensile strength[2] in p.s.i. | Elongation[2] in percent | Transparency (visual) | Resilience (bend recovery) |
| --- | --- | --- | --- | --- | --- | --- | --- | --- | --- |
| | Weight | Stoichiometric | | | | | | | |
| 4 | 0 | 0 | 5.8 | 9,900 | 890 | 3,414 | 550 | Hazy | Limp. |
| 5 | 1 | 15 | 3.9 | 18,950 | 1,100 | 3,525 | 440 | Slight haze | Fair. |
| 6 | 2 | 30 | 4.9 | 20,340 | 1,130 | 3,740 | 443 | Very slight haze | Do. |
| 7 | 5 | 74 | 4.8 | 24,220 | 1,320 | 3,880 | 450 | Transparent | Good. |
| 8 | 10 | 148 | 5.2 | 38,400 | 1,600 | 3,423 | 370 | ___do___ | Very good. |
| 9 | 15 | 223 | 5.2 | 40,000 | 1,734 | 3,560 | 380 | ___do___ | Do. |

[1] ASTM-D-747-58T.  [2] ASTM-D-412-51T.

EXAMPLE 10

To a solution of 50 g. of an ethylene/acrylic acid copolymer containing 5 weight percent of acrylic acid and having a melt index of 10 g./10 min. in 250 ml. of xylene maintained at a temperature of 130° C. was added 3 g. of data, paraphenylene diamine having a dissociation constant of $1 \times 10^{-8}$ results in a diamine modified copolymer which shows borderline improvement over the unmodified polymer. This borderline improvement is further apparent from the transparency of the modified copolymer as well as its infrared spectrum and its resiliency.

TABLE III

| Example | Diamine Type | Wt. percent | Diss. Const. | Melt index in g./10 min. | Stiffness in p.s.i.[1] | Yield strength in p.s.i.[2] |
|---|---|---|---|---|---|---|
| 16 | | | | 5.8 | 9,900 | 890 |
| 17 | Diethylene triamine | 4 | | 3.5 | 22,700 | 1,315 |
| 18 | Ethylene diamine | 3.5 | | 5.8 | 13,300 | 1,150 |
| 19 | Piperazine | 20 | $6.4 \times 10^{-5}$ | 5.4 | 18,000 | 1,170 |
| 20 | p-Phenylene diamine | 25 | $1.1 \times 10^{-8}$ | 5.3 | 16,100 | 1,160 |
| 21 | N,N'-diisopropyl hexamethylene diamine | 12 | | 5.3 | 29,000 | 1,800 |
| 22 | Decamethylene diamine | 12 | | 4.9 | 31,440 | 1,730 |
| 23 | N,N'-tetramethyl hexamethylene diamine | 15 | | 5.5 | 28,000 | 1,400 |

[1] ASTM-D-747-58T. [2] ASTM-D-412-57T.

EXAMPLE 24

An ethylene-methacrylic acid copolymer containing 18 weight percent of methacrylic acid and having a melt index of 6.3 g./10 min. was modified with 18 weight percent of diethylene triamine using the solution procedure described in the foregoing examples. The resulting diamine modified copolymer was found to have a stiffness of 43,650 p.s.i. compared to a stiffness of 16,400 p.s.i. for the unmodified copolymer and an ultimate strength of 5,200 p.s.i. compared to an ultimate strength of 5,000 p.s.i. for the unmodified polymer.

Example 24 was repeated except that instead of the diethylene triamine, ethylene diamine was employed. The resulting diamine modified copolymer was found to have a stiffness of 41,650 p.s.i., as compared to a stiffness of 16,400 p.s.i. for the unmodified copolymer.

EXAMPLE 25

Employing the procedure of Examples 4 to 9, 50 g. of an ethylene/methacrylic acid copolymer containing 10% by weight of methacrylic acid and having a melt index of 5.8 g. was reacted with 5 g. of bis(p-aminocyclohexyl) methane. The product was isolated by methanol precipitation. The resulting dried product was compression molded and stiffness and tensile properties were measured. The melt index of the modified copolymer was 4.4 g./10 min. The stiffness of the modified copolymer was measured to be 40,400 p.s.i. as compared to 9,900 p.s.i. for the unmodified copolymer. The yield strength was measured to be 1,880 p.s.i. as compared to 890 p.s.i. for the unmodified copolymer. The transparency of the modified copolymer was greatly improved over that of the unmodified copolymer on the basis of molded samples.

EXAMPLE 26

To a solution of 50 g. of an ethylene/methacrylic acid copolymer containing 10 weight percent methacrylic acid and having a melt index of 5.8 g./10 min. in 250 ml. of xylene maintained at a temperature of 100° C. was added 3 grams of strontium hydroxide dissolved in 50 ml. of water. Gelation followed immediately. The product was recovered by precipitation with methanol and washed thoroughly with water and acetone. The product was dried in a drying oven. The product has a melt index of 0.19 g./10 min. Glass clear moldings were made from the copolymer.

As stated earlier the process of the present invention can be carried out in an extractor extruder. When carried out in an extractor extruder the temperature of the neutralization reaction is within the range of 100 to 290° C. and the pressure on the constituents is in the range of 100 to 10,000 p.s.i. The material that forms cations may be added to the copolymer as an aqueous solution, or in a substantially dry form. The process as carried out in the extractor extruder is a continuous one, that is, copolymers and cation-forming material are fed continuously into the extruder and ion linked copolymer is continuously removed from the extruder. At pressures of 100 to 5000 p.s.i. and at temperatures of 100 to 290° C. the mixing action of the extruder produces what appears to be a single phase mixture, thus assuring a uniform degree of neutralization.

The process in the extractor extruder can be divided roughly into four steps which steps correspond to the zones in the reactor. In the first zone the copolymer is thoroughly mixed at high pressure and heated to above its melting point, cation-forming material may be present in this zone. In the second zone neutralization of the carboxylic acid groups takes place. If the cation-forming material was not present in the first zone, it is added at this point. The copolymer then passes to a third zone, a zone of reduced pressure in which the volatile materials in the copolymers, for example, water and acid formed when the copolymer was neutralized with an acid salt, are vaporized and removed. The copolymer then passes to a fourth zone in which the polymer is removed from the extractor extruder. There may be more than one zone of a particular type and the zones may be of different dimensions.

EXAMPLES 27–34

To the feed opening of a 2-inch plasticating extruder were fed as separate streams, pellets of a copolymer of ethylene and methacrylic acid and a metal compound substantially insoluble in the molten polymer. The feed rate of the resin varied from 15 to 22 lbs./hr. The screw was made up of an 8-diameter long plasticating section, a 13.5 diameter long mixing section of the type described in U.S. Patent 3,006,029, a throttle ring to allow pressure to be maintained in the mixing section, a 5-diameter long extraction section and a 4-diameter long pumping section. At the inlet of the mixing section an acid solution was injected into the molten resin. The melt temperature at this point was 156° C. and the pressure was 400 p.s.i. The mixture was allowed to react in the mixing section, after which the molten mixture at a tempreature of 210° C., passed over the throttle ring into the extraction zone. The melt was devolatilized under a vacuum of 27 in Hg. Subsequently, the dried, molten ion linked resin was ex-

TABLE IV

| Example | Acid copolymer | | | Metal compound | | Acid solution | | | Product | | |
|---|---|---|---|---|---|---|---|---|---|---|---|
| | Weight percent of methacrylic acid | Melt index, g./10 min. | Stiffness, p.s.i. | Type | Feed rate, lb./hr. | Type | Volume percent aqueous solution | Feed rate, cc./min. | Production rate, lb./hr. | Melt index, g./10 min. | Stiffness, p.s.i. |
| 27 | 15 | 71 | 12,250 | ZnO | 0.80 | Propionic acid | 50 | 5.29 | 16.5 | 1.52 | 44,650 |
| 28 | 15 | 71 | 12,250 | ZnO | 1.05 | Acetic acid | 100 | 6.0 | 18.5 | 0.28 | 52,480 |
| 29 | 15 | 71 | 12,250 | ZnO | 1.49 | Methacrylic acid | 60 | 9.17 | 17.5 | 0.19 | 53,760 |
| 30 | 15 | 71 | 12,250 | ZnO | 1.18 | Lactic acid [3] | 60 | 5.85 | 15.8 | 0.29 | 60,340 |
| 31 | 15.3 | 6.3 | 24,250 | ZnO | 1.12 | Acetic Acid Isopropanol | 50 25 | 5.22 | 22 | 0.13 | 53,040 |
| 32 | 15.3 | 6.3 | 24,250 | ZnO | 1.07 | Heptanoic acid Acetic acid | 61.9 22.7 | 9.0 | 22 | 0.16 | 45,060 |
| 33 | [1] 10 | 90 | | ZnO | 0.89 | do | 50 | 4.83 | 19.1 | 2.64 | |
| 34 | [2] 9 | 178 | | ZnO | 0.36 | do | 50 | 5.5 | 13.5 | 25 | |

[1] Terpolymer of: 67% ethylene, 24% vinyl acetate and 10% methacrylic acid.
[2] Terpolymer of: 70% ethylene, 20% vinyl acetate and 9% methacrylic acid.
[3] Lactic acid does not completely solubilize ZnO under the conditions of the reaction. Further mixing will result in complete solubilization.

truded as a strand, cooled in water and cut into pellets. The pertinent physical properties were measured.

The specific operating details, the reagents employed and some of the polymer properties affected are shown in Table IV.

EXAMPLES 35–42

To the feed opening of a 3.5 inch plasticating extruder were fed, as separate streams pellets of ethylene methacrylic acid copolymer and a dry powdery mixture, defined as premix composition, of one or more metal compounds, finely divided copolymer and equal parts of dilauryl thiodipropionate and dodecylpentaerythritol diphosphate as stabilizer. In the extruder, the plastic pellets were melted and conveyed along with the crudely incorporated premix to the mixing section. The initial plasticating screw was 7 diameters long and maintained at a temperature of about 158° C. At the inlet of the mixing section an acid solution was injected into the molten stock by means of a nozzle penetrating the barrel wall. The mixing section was of the type described in U.S. Patent No. 3,006,029 and was 13 diameters long. In the mixing section maintained at a temperature of 270 to 280° C., the premix composition reacted with the polymer melt to neutralize the acid groups of the polymer through the formation of a soluble metal salt.

At the end of the mixing section the mixture of ion linked copolymer and reaction by-products passed through a pressure-control valve and a transfer line into a 2-inch diameter extraction extruder. The stock temperature before the valve was 280° C. and the pressure 750 p.s.i. This extruder had two extraction zones, each about 4 diameters in length, in series. The first extraction zone was maintained at 27 in. of Hg and the second at 28 in. Hg. The temperature of the melt was maintained between 270° C. and 280° C. The extraction zone removed the volatile constituents from the molten, ion linked copolymer. The polymer was pumped out through a die in the form of strands, which were cooled in water and cut into pellets.

The specific operating details, the reagents employed and some of the polymer properties affected are shown in Table V.

TABLE V

| Example | Methacrylic acid copolymer | | | Premix composition | | | | |
| --- | --- | --- | --- | --- | --- | --- | --- | --- |
| | Weight percent acid | Melt index, g./10 min. | Stiffness, p.s.i. | Copolymer, parts | Metal compound | | Stabilizer, parts | Feed rate, lb./hr. |
| | | | | | Type | Parts | | |
| 35 | 9.5 | 45 | 12,000 | | $ZnO_2$ | | | 1.76 |
| 36 | 9.5 | 45 | 12,000 | 8.74 | $Mg(OH)_2$ / $Mg(C_2H_3O_2)_2 \cdot 4H_2O$ | 4.54 / 4.20 | 0.14 | 3.1 |
| 37 | 9.5 | 45 | 12,000 | 8.74 | $Mg(OH)_2$ / $Mg(C_2H_3O_2)_2 \cdot 4H_2O$ | 4.54 / 4.20 | 0.14 | 2.45 |
| 38 | 9.5 | 45 | 12,000 | 9.08 | ZnO | 9.08 | 0.15 | 3.06 |
| 39 | 11.7 | 5.9 | 18,400 | 7.5 | $Mg(OH)_2$ / $Mg(C_2H_3O_2)_2 \cdot 4H_2O$ | 5.0 | 0.20 | 3.16 |
| 40 | 9.5 | 4.3 | 14,000 | 8.64 | $LiOH \cdot H_2O$ / ZnO | 4.41 / 4.23 | 0.07 | 1.66 |
| 41 | 15.3 | 6.3 | 24,250 | 8.74 | $Mg(OH)_2$ / $Mg(C_2H_3O_2)_2 \cdot 4H_2O$ | 4.54 | 0.14 | 2.1 |
| 42 | 15.3 | 6.3 | 24,250 | 8.64 | $LiOH \cdot H_2O$ / ZnO | 4.41 | 0.07 | 1.74 |

| Example | Acid | | | Product | | |
| --- | --- | --- | --- | --- | --- | --- |
| | Aqueous solution of— | Volume percent | Feed rate, cc./min. | Rate, lb./hr. | Melt index, g./10 min. | Stiffness, p.s.i. |
| 35 | Acetic acid | 40 | 13.8 | 55 | 0.7 | 36,600 |
| 36 | do | 40 | 13.0 | 47 | 0.52 | 38,380 |
| 37 | do | 40 | 13.5 | 47 | 1.52 | 37,960 |
| 38 | do / Lactic acid | 37 / 3.8 | 13.5 | 54 | 1.72 | 34,420 |
| 39 | Acetic acid | 40 | 13.0 | 57 | 0.37 | 37,000 |
| 40 | do | 40 | 13.8 | 60 | 1.2 | 33,100 |
| 41 | do | 40 | 13.8 | 59 | 1.25 | 52,900 |
| 42 | do | 40 | 13.8 | 58 | 0.84 | 62,100 |

EXAMPLES 43–46

The ethylene/methacrylic acid copolymer employed in the foregoing examples was extruded through a two inch extruder equipped with mixing torpedoes and an injection device in the extruder barrel. The resin was extruded at 30 r.p.m. (screw speed) and a melt temperature of 170 to 180° C. Hexamethylene diamine in the concentration indicated was injected into the mixing section of the extruder. The stiffness and tensile properties of the resulting products obtained at the three levels of hexamethylene diamine concentration were determined on 60 mil sheets made from the extruded product. The data obtained are shown in Table VI and compared with the unmodified copolymer. It was observed that in the experiment in which 10 weight percent of hexamethylene diamine was added the mixing action of the extruder employed was insufficient to assure complete distribution and reaction of the hexamethylene diamine added. The addition of the hexamethylene diamine in all three concentrations did not significantly affect the extrusion behavior of the copolymer.

TABLE VI

| Example | Weight percent methylene diamine | Melt index in g./10 min. | Stiffness in p.s.i.[1] | Yield strength in p.s.i.[1] | Ultimate strength in p.s.i.[2] | Elongation in percent[2] |
| --- | --- | --- | --- | --- | --- | --- |
| 43 | | 5.8 | 9,900 | 890 | 3,414 | 530 |
| 44 | 3 | 5.07 | 26,110 | 1,530 | 3,670 | 470 |
| 45 | 5 | 7.04 | 27,000 | 1,960 | 4,000 | 460 |
| 46 | 10 | 7.2 | 29,000 | 1,680 | 3,730 | 450 |

[1] ASTM-D-747-58T.   [2] ASTM-D-412-57T.

EXAMPLE 47

High molecular weight, commercially available polypropylene was oxidized with molecular oxygen to result in the formation of peroxygen groups in the polymer. The resulting product was then reacted with acrylic acid until a graft copolymer of polypropylene containing 3% of acrylic acid was obtained. The graft copolymer had a melt index of 13 g./10 minutes. The resulting product was extruded in a 2 inch extruder equipped with mixing torpedoes and an injection device at a screw speed of 30 r.p.m. and a temperature of 190 to 220° C. Approximately 3% of hexamethylene diamine was injected into the melt in the mixing section of the extruder. The resulting extrudate was greatly improved in transparency and resilience. Compression molded samples of the material were significantly stiffer as compared to the unmodified copolymer. No significant change in the extrusion behavior of the copolymer was found as a result of the addition of hexamethylene diamine.

EXAMPLES 48–57

Ethylene methacrylic acid copolymers were ionically linked using aqueous solutions of sodium hydroxide, in an extractor extruder under the conditions shown in the Table VII with the results as shown in Table VII.

ness over products produced under the same condition but without the addition of hexamethylene diamine.

As stated earlier, the process of this invention can be carried out on a mill. The copolymer is milled at a temperature above its melting point, preferably 110 to 160° C., and then cation forming material is added to the copolymer as the milling is continued. Preferably, the cation forming material is added as an aqueous solution, for although the temperature is above the temperature at which water vaporizes, the water is present sufficiently long that the neutralization reaction takes place. The neutralization reaction is substantially stoichiometric so the amount of cation to be added can be predetermined. The ion crosslinked copolymer is then removed from the mill.

In the following examples which illustrate the process of this invention using a mill, all parts and percentages are in parts by weight unless otherwise indicated.

EXAMPLE 60

A 500 g. sample of an ethylene/methacrylic acid copolymer, containing 10 weight percent of methacrylic acid and having a melt index of 5.8 g./10 min. (ASTM–D–1238–57T) was banded on a 6 inch rubber mill at 150° C. After the copolymer had attained the mill temperature,

TABLE VII

| Example | Base resin | | | Product rate, lbs./hr. | Solution | | Product properties | | Reactor extruder, diam., in. | Conditions in reaction zone | | | |
|---|---|---|---|---|---|---|---|---|---|---|---|---|---|
| | Percent MMA | MI, g./10 min. | Stiffness, p.s.i. | | Conc., percent | Flow rate, cc./min. | MI, g./10 min. | Stiffness, p.s.i. | | Melt, in | Temp., ° C., out | Pressure, p.s.i. | Screw speed, r.p.m. |
| 48 | 15.3 | 6.3 | 24,250 | 15 | 30 | 7 | .51 | 71,100 | 2 | 158 | 191 | 800 | 51 |
| 49 | 15.3 | 6.3 | 24,250 | 16 | 30 | 6 | .76 | 54,900 | 2 | 165 | 206 | 600 | 59 |
| 50 | 15.3 | 6.3 | 24,250 | 21 | 50 | 6.8 | .18 | 60,550 | 2 | | 241 | 400 | 82 |
| 51 | 15.3 | 6.3 | 24,250 | 21 | 50 | 7.7 | .09 | 60,360 | 2 | | 247 | 450 | 82 |
| 52 | 10.9 | 4.9 | 17,200 | 73 | 50 | 23 | .11 | 40,100 | 3.5 | 191 | 255 | 1,200 | 61 |
| 53 | 10.9 | 4.9 | 17,200 | 81 | 50 | 21.4 | .15 | 37,700 | 3.5 | 198 | 294 | 1,000 | 65 |
| 54 | 11.7 | 5.9 | 15,000 | 83 | 50 | 25 | .09 | 41,200 | 3.5 | 196 | 266 | 1,500 | 67 |
| 55 | 9.5 | 43 | 12,400 | 91 | 50 | 21.8 | 1.0 | 33,000 | 3.5 | 163 | 200 | 850 | 72 |
| 56 | 9.5 | 4.3 | 14,000 | 67 | 50 | 17.5 | .07 | 32,000 | 3.5 | | 274 | 1,650 | 62 |
| 57 | 12.4 | 52 | 11,000 | 78 | 50 | 8.8 | 30 | 29,000 | 3.5 | | 230 | 750 | 66 |

As previously stated, the process of this invention may be carried out by injection of cation forming material into a polymerization reactor, immediately after the polymerization reaction is completed. The polymerization reaction is usually carried out at temperatures within the range of 150 to 300° C. and at pressures within the range of 50 to 3000 atmospheres using a free radical polymerization catalyst. The cations will react stoichiometrically under these conditions. The pressure is then released, flashing off most of the volatile components; the remainder of the volatile components may be removed from the polymer. This may be accomplished by a drying oven and/or an extractor extruder.

EXAMPLE 58

Ethylene and methacrylic acid were copolymerized at a temperature of 220° C. and at a pressure of 1400 atmospheres, with benzoyl peroxide initiator, in a manner known in the art to produce 500 g. of polymer. The copolymer contained 8.5 weight percent methacrylic acid. After the reaction was complete, but before the pressure was let off, a 20 g. solution of sodium hydroxide in 100 ml. of water was introduced into the reactor and the pressure let down 10 seconds later. The product was dried for 18 hours in a drying oven, and then run three times through an extractor extruder. The resin had a melt index of .1 g./10 min. Without the addition of sodium hydroxide, the melt index would have been about 3.3 g./10 minutes.

EXAMPLE 59

The process of the previous example was repeated, only this time 20 g. hexamethylene diamine were added to the copolymer prior to letting off the pressure. The product had improved transparency, toughness, and stiffness over products produced under the same condition but without the addition of hexamethylene diamine.

24 g. of sodium methoxide dissolved in 100 ml. of methanol was added to the copolymer over a period of 5 minutes as working of the copolymer on the mill was continued. Melt blending of the composition was continued for an additional 15 minutes during which time the initially soft, fluid melt became stiff and rubbery on the mill. However, the polymer could still be readily handled on the mill. The resulting product was found to have a melt index of less than 0.1 g./10 minutes and resulted in transparent, as compared to opaque for the copolymer base, moldings of greatly improved tensile properties.

EXAMPLE 61

To 50 g. of an ethylene/methacrylic acid copolymer containing 10 weight percent of methacrylic acid and having a melt index of 5.8 g./10 minutes milled at a temperature of 125 to 135° C. on a 6-inch rubber mill was added gradually 6.3 g. of magnesium acetate ($\times 4H_2O$) in 25 ml. of water. Milling was continued for 15 minutes at which time the evolution of acetic acid had ceased. The product had a melt index of 0.12 g./10 minutes and resulted in clear, resilient moldings.

EXAMPLE 62

To 50 g. of an ethylene/itaconic acid copolymer having a melt index of 9 g./10 minutes and containing 3 percent by weight of the copolymer of itaconic acid was gradually added 3 g. of sodium hydroxide in 20 ml. of water while the polymer was being worked on a 6-inch rubber mill at a temperature of 150° C. Upon addition of the hydroxide, the polymer melt became stiff, transparent and elastomeric.

EXAMPLE 63

To 50 g. of a copolymer of ethylene and maleic anhydride, containing 7 weight percent of copolymerized maleic anhydride and having a melt index of 8.5 g./10 minutes, being milled on a rubber mill at a temperature of 135° C., is added 22.8 g. of zinc monoacetate monostearate. After 15 minutes on the mill a transparent, tough, resilient polymer product is obtained having sufficient melt flow for fabrication into film by standard melt extrusion. Repeating the experimental procedure with zinc acetate an intractible resin is formed within 10 minutes of milling, preventing further milling. The resin could not be extruded into a film using standard melt extrusion.

EXAMPLE 64

To 50 g. of a copolymer of ethylene and methacrylic acid, containing 10 weight percent of copolymerized methacrylic acid and having a melt index of 5.8 g./10 minutes, being milled on a rubber mill at 130° C. are added the following components in the order indicated: (a) 3.25 g. zinc oxide, (b) 11.7 g. stearic acid, and (c) 2.5 g. of acetic acid. Only after the addition of the acetic acid does the melt become clear and an increase in viscosity is observed. After 10 minutes of further milling the copolymer is removed. Although the melt index is reduced, the resulting ionic copolymer is suitable for melt fabrication.

EXAMPLE 65

An ethylene/methacrylic acid copolymer containing 10 percent methacrylic acid was banded on a two roll mill at 170° C. and 3.6 weight percent of powdered sodium hydroxide was added over a period of 2 minutes. Milling was continued over a period of 10 minutes to ensure homogeneity. The ionic copolymer obtained was reduced more than tenfold in melt index and was glass clear and resilient. When extruded as a melt, the ionic copolymer could be drawn into fibers having pronounced elastic recovery.

EXAMPLE 66

A 500 g. sample of an ethylene methacrylic acid copolymer containing 10 weight percent methacrylic acid and having a melt index of 5.8 g./10 minutes was milled on a 6-inch rubber mill at 150° C. After the copolymer had attained the mill temperature, 30 g. of hexamethylene diamine were added to the copolymer over a 10 minute period as the milling was continued. The blending was continued for 10 more minutes. The melt index of the product was not substantially changed. But the polymer was transparent. The stiffness measured to from about 10,000 p.s.i. to about 29,000 p.s.i. and the yield strength from about 900 p.s.i. to about 1600 p.s.i.

The high molecular weight ion linked copolymers prepared by the described process can be extruded into films of excellent clarity, fibers of outstanding elasticity and resilience, pipes with superior stress-crack resistance, wire coatings with improved cut-through resistance and good dielectric properties despite the presence of metal ions, and foamed sheets; they can be further injection molded into intricate shapes and closely retain the dimension of the mold; they can be vacuum formed, blow molded and compression molded with greater ease and better properties than linear hydrocarbon polymers. Ion linked copolymers can, furthermore, be drawn and uniaxially or biaxially oriented. Ionic copolymer surfaces are printable and adhere well to adhesives commercially available. Thus, they can be laminated to paper, metal foil and other plastic surfaces. The adhesion of the ionic copolymer is so good that they themselves can be employed as adhesives. Low molecular weight ionic copolymers, particularly, are useful for such purposes. Many other uses and modifications of the ion linked copolymers of the present invention will be apparent from the foregoing description and it is not intended to exclude such from the scope of this invention.

I claim:
1. A process of ionically cross-linking copolymers formed by copolymerizing at least one alpha-olefin of the general formula $RCH=CH_2$ where R is a radical of the class consisting of hydrogen and hydrocarbyl radicals having one to eight carbon atoms, and at least one alpha, beta-ethylenically unsaturated carboxylic acid having one to two carboxylic acid groups and three to eight carbon atoms, the alpha-olefin content of said copolymers comprising at least 50 mol percent of said copolymer, the alpha,beta-ethylenically unsaturated acid content of said copolymer comprising 0.2 to 25 mol percent of said copolymer, which comprises mixing said copolymer with a cation supplying material at a pressure of 100 to 10,000 p.s.i. and a temperature above the melting point of the copolymer and between 100° C. and 290° C., so that the cation supplying material forms cations, the cations having an effective valence of one to three, the number of cations formed being sufficient to neutralize at least 10 percent of the carboxylic acid groups, and neutralizing at least 10 percent of the carboxylic acid groups in the copolymer.

2. The process of claim 1 in which the process is a continuous process in which the polymer is continuously advanced from one step to another.

3. A process for the preparation of ion-linked copolymer which comprising copolymerizing at least one alpha-olefin having the formula $RCH=CH_2$ at least one alpha, beta-ethylenically unsaturated carboxylic acid having one to two carboxylic acid groups and having three to eight carbon atoms, at a temperature between 80 and 300° C. and at a pressure within the range of 50 to 3000 atmospheres with a free-radical polymerization initiator to form a copolymer having an alpha-olefin content of greater than 50 mol percent, and an alpha,beta-ethylenically unsaturated carboxylic acid content of between 0.2 mol percent and 25 mol percent, adding a cation supplying material to the polymer prior to releasing said pressure, under such conditions that the cation forming material is ionized to form cations selected from the class consisting of metallic cations having an effective valence of 1 to 3 and amine ions, releasing said pressure and removing volatile constituents from the copolymer.

4. A process of ionically cross-linking copolymers formed by copolymerizing at least one alpha-olefin having the formula $RCH=CH_2$, where R is a radical of the class consisting of hydrogen and hydrocarbyl radicals having one to eight carbon atoms, and at least one alpha, beta-ethylenically unsaturated carboxylic acid, having one to two carboxylic acid groups, and three to eight carbon atoms, the alpha-olefin content of the copolymer comprising at least 50 mol percent of the copolymer, the alpha,beta-ethylenically unsaturated carboxylic acid content of said copolymer comprising 0.2 to 25 mol percent of said copolymer to a predetermined degree by neutralizing a predetermined amount greater than 10% of the acid groups with cations, which comprises mixing said copolymer with a cation supplying material under such conditions that the cation supplying material is ionized to form cations of the class consisting of metallic cations, having an effective valence of 1 to 3 and amine cations, at a temperature above the melting point of the copolymer and between 100° C. and 290° C. and at a pressure of 100 to 10,000 p.s.i., the quantity of cations being sufficient to neutralize at least 10 percent of the resulting mixture, removing volatile constituents from the mixture by reducing the pressure, and recovering ion-linked copolymer.

5. The process of claim 4 which is operated continuously.

6. The process of claim 5 which is carried out in an extractor extruder.

7. A process of ionically crosslinking a polymer formed by copolymerizing at least one alpha-olefin of the general formula $RCH=CH_2$, where R is a radical of the class consisting of hydrogen and hydrocarbyl radicals having one to eight carbon atoms, and at least one alpha,beta-ethylenically unsaturated carboxylic acid having one to two carboxylic acid groups and three to eight carbon atoms, the alpha-olefin content of said polymer comprising at least 50 mol percent of said polymer, the alpha, beta-ethylenically unsaturated acid content of said polymer comprising 0.2 to 25 mol percent of said polymer which comprises milling said polymer and adding the metallic cation forming material in solution at a temperature above the melting point of the polymer and at atmospheric pressure.

References Cited

UNITED STATES PATENTS

| | | | |
|---|---|---|---|
| 3,132,120 | 5/1964 | Graham | 260—86.7 |
| 3,264,272 | 10/1966 | Rees | 260—78.5 |
| 2,757,153 | 7/1956 | Bowen | 260—78.5 |
| 2,999,056 | 9/1961 | Tanner | 204—159.16 |
| 2,757,106 | 7/1956 | Brown | 260—78.5 |
| 2,607,762 | 8/1952 | Bowen | 260—78.5 |

JOSEPH L. SCHOFER, *Primary Examiner.*

J. KIGHT, *Assistant Examiner.*